(12) United States Patent
Blakeslee et al.

(10) Patent No.: US 7,562,879 B1
(45) Date of Patent: Jul. 21, 2009

(54) METHOD AND APPARATUS FOR CREATING AN AUGER ARM AND BEARING SEAL

(75) Inventors: Edward A. Blakeslee, Ephrata, PA (US); Wayne D. Thaxton, Denver, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/112,947

(22) Filed: Apr. 30, 2008

(51) Int. Cl.
*F16J 15/38* (2006.01)

(52) U.S. Cl. .................. 277/590; 277/316; 277/349; 277/645; 277/605

(58) Field of Classification Search ............ 277/316, 277/645, 605, 626, 627, 390, 349, 434, 411, 277/321, 412, 500, 512, 612, 530, 575, 368; 384/100, 42; 56/14.5, 158, 364
See application file for complete search history.

(56) References Cited

U.S. PATENT DOCUMENTS

| | | | |
|---|---|---|---|
| 1,780,481 A | 11/1930 | Hale | |
| 2,518,521 A | 8/1950 | Carroll | |
| 2,644,284 A | 7/1953 | Oberholtz et al. | |
| 2,758,857 A * | 8/1956 | Smith | 277/512 |
| 3,128,133 A * | 4/1964 | Audemar | 277/431 |
| 3,679,277 A * | 7/1972 | Dohmen | 384/480 |
| 4,061,345 A * | 12/1977 | Lund | 277/383 |
| 4,300,333 A | 11/1981 | Anderson | |
| 4,381,127 A * | 4/1983 | Visser | 384/151 |
| 4,471,602 A | 9/1984 | Leigers | |
| 4,774,848 A | 10/1988 | Zupancic | |
| 5,305,586 A | 4/1994 | Lundahl et al. | |
| 5,426,148 A * | 6/1995 | Tucker | 524/496 |
| 5,715,976 A | 2/1998 | Kautz | |
| 5,735,603 A * | 4/1998 | Kesig et al. | 366/331 |
| 6,206,177 B1 | 3/2001 | Broten | |
| 6,390,666 B1 * | 5/2002 | Schafer et al. | 366/331 |
| 6,564,535 B1 | 5/2003 | Nafziger et al. | |

FOREIGN PATENT DOCUMENTS

| | | |
|---|---|---|
| JP | 361162417 | 7/1986 |
| JP | 402276710 | 11/1990 |
| JP | 410148466 | 6/1998 |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A seal mechanism for a transverse crop conveying auger in a header that incorporates a flexible-sealant-filled labyrinth at each end of a tube-like auger central core that allows rotation of the auger without allowing entry of dirt, debris, or other contaminants into the bearing housing area positioned inside of the tube-like central core of the auger.

20 Claims, 3 Drawing Sheets

US 7,562,879 B1

METHOD AND APPARATUS FOR CREATING AN AUGER ARM AND BEARING SEAL

BACKGROUND OF THE INVENTION

This invention relates generally to a machine having a header for harvesting crops in a field and forming a windrow of cut crop and, more particularly, to a method and apparatus for creating a seal for preventing entry of dirt, debris, and/or water into the bearing area of a transverse auger disposed on the header.

Modern crop harvesting machines having disc cutting headers typically experience significant amounts of dirt, debris, and moisture moving through the header during operation. Even during idle periods, exposure to weather can result in water intrusion. Preventing these contaminants from entering bearings of moving elements, especially the transverse consolidation augers, has proven to be problematic. Entry of dirt, debris, or water into the auger bearing housing creates an environment conducive to corrosion and bearing deterioration and increased maintenance costs of the machine.

It would be desirable to provide an easily installable seal mechanism for preventing entry of dirt, water, and other contaminants into the bearing housing area of a rotating transverse auger in a header that would overcome the above problems and limitations.

SUMMARY OF THE INVENTION

Accordingly, it is an object of the present invention to provide a sealing mechanism integrated into the auger support arms that prevents the entry of dirt, debris, water, and other contaminants into the auger bearing housing area.

It is a further object of the present invention to provide a sealing mechanism for a transversely arranged crop conveyance auger that prevents the intrusion of contaminants into the bearing housing during machine operation.

It is a further object of the present invention to provide a sealing mechanism for a transversely arranged crop conveyance auger that prevents the intrusion of contaminants into the bearing housing when the machine is non-operational, such as when the machine is being stored.

It is a further object of the present invention to provide a sealing mechanism for an auger on a header incorporating a labyrinth structure and a flexible sealing material.

It is a still further object of the present invention to provide a sealing mechanism incorporating a flexible sealing material that will conform to minor variations in component fit-up due to manufacturing and assembly tolerances to provide a tight seal between the seal support and the rotating auger.

It is a still further object of the present invention to provide a sealing mechanism for a rotating auger on a crop header that may be easily adapted for use on a variety of headers.

It is yet another object of the present invention to provide a seal mechanism for a crop conveying auger that incorporates standard interface connections for use with existing header and auger designs thereby enabling efficient manufacturing of crop headers.

It is a still further object of the present invention to provide a seal mechanism for a transverse auger in a header that is durable in construction, inexpensive of manufacture, carefree of maintenance, easily assembled, and simple and effective to use.

These and other objects are achieved according to the instant invention by providing a seal mechanism for a transverse crop conveying auger in a header that incorporates a flexible-sealant-filled labyrinth at each end of a tube-like auger central core that allows rotation of the auger without allowing entry of dirt, debris, or other contaminants into the bearing housing area positioned inside of the tube-like central core of the auger.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
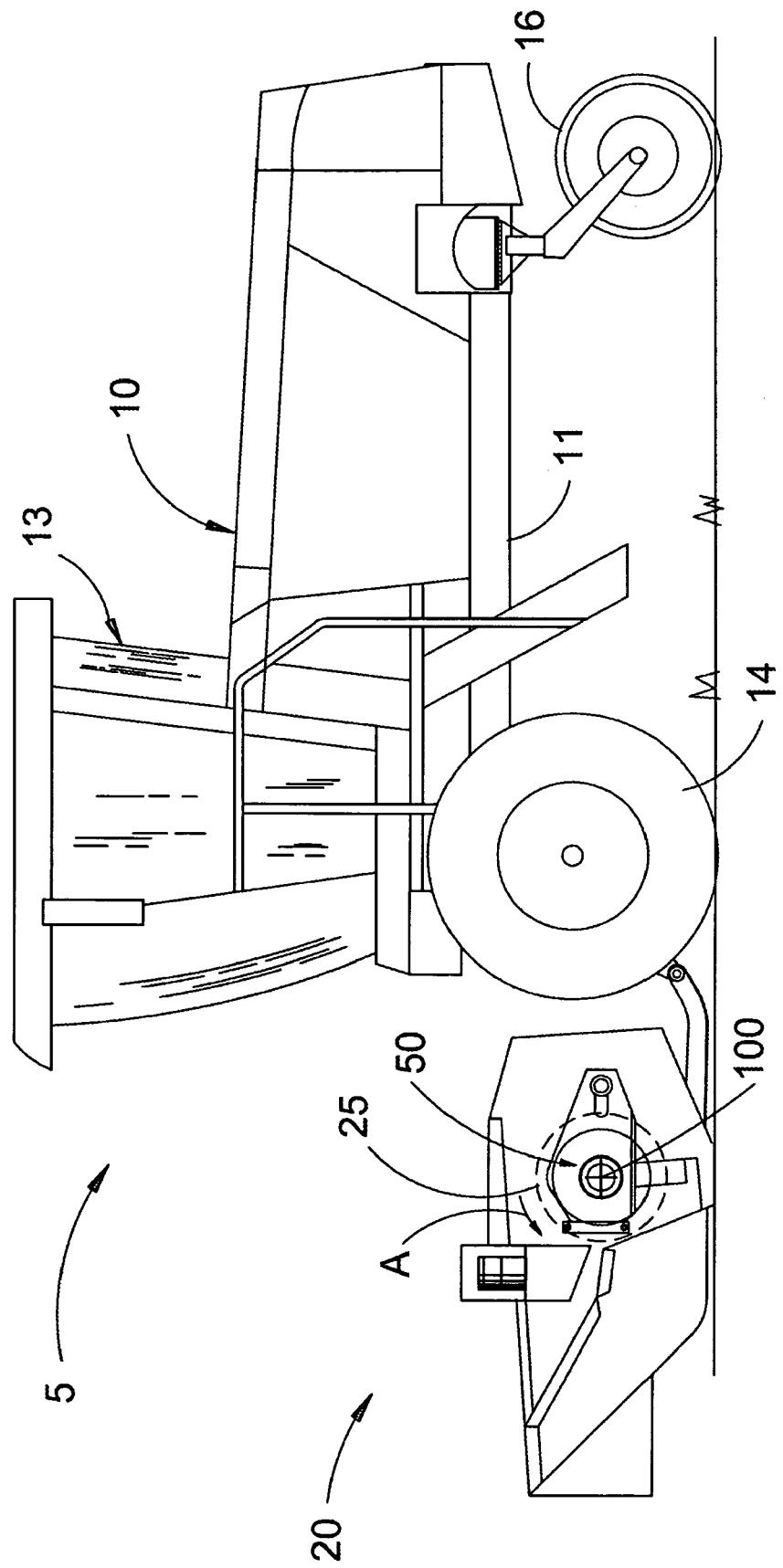
FIG. 1 is a side elevation view of a typical agricultural windrower suitable for fitment with a specialty cutting header of the type on which the present invention is useful.

FIG. 1 shows a side view of a typical self-propelled windrower 5 used for harvesting a standing crop as it travels forwardly across the ground. Usually, a tractor 10 pushes a header 20 which severs the crop material from the ground by a sickle-bar, rotary cutter or other functionally equivalent cutting means arranged along the forward edge of the header 20. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material is urged toward the center of the header by a transversely arranged elongate crop conveyance auger 25 supported at each end by side walls 22 of the header. Auger 25 is rotatable about axis 100, generally in the direction indicated by arrow "A." The crop is then ejected rearwardly from the header 20, generally in the space between the drive wheels 14, through a centrally positioned crop discharge zone whereupon it falls to the ground in a windrow. Alternatively, a crop processing apparatus, such as conditioner rolls, may be positioned to receive crop from the discharge zone, process the crop material, and then discharge to the ground in the form of a windrow. Shields (not shown) are used to arrange the windrow into a desired uniform configuration generally trailing along the longitudinal axis of the windrower.

The general operation and construction of windrowers of the type on which the present invention may find utility can be found in U.S. Pat. Nos. 5,327,709, issued on Jul. 12, 1994, to Webb, 6,073,431, issued on Jun. 13, 2000, to Osborne et al., and 6,662,539, issued on Dec. 16, 2003 to Adams et al., the descriptive portions of which are incorporated herein by reference.

Figure 2:
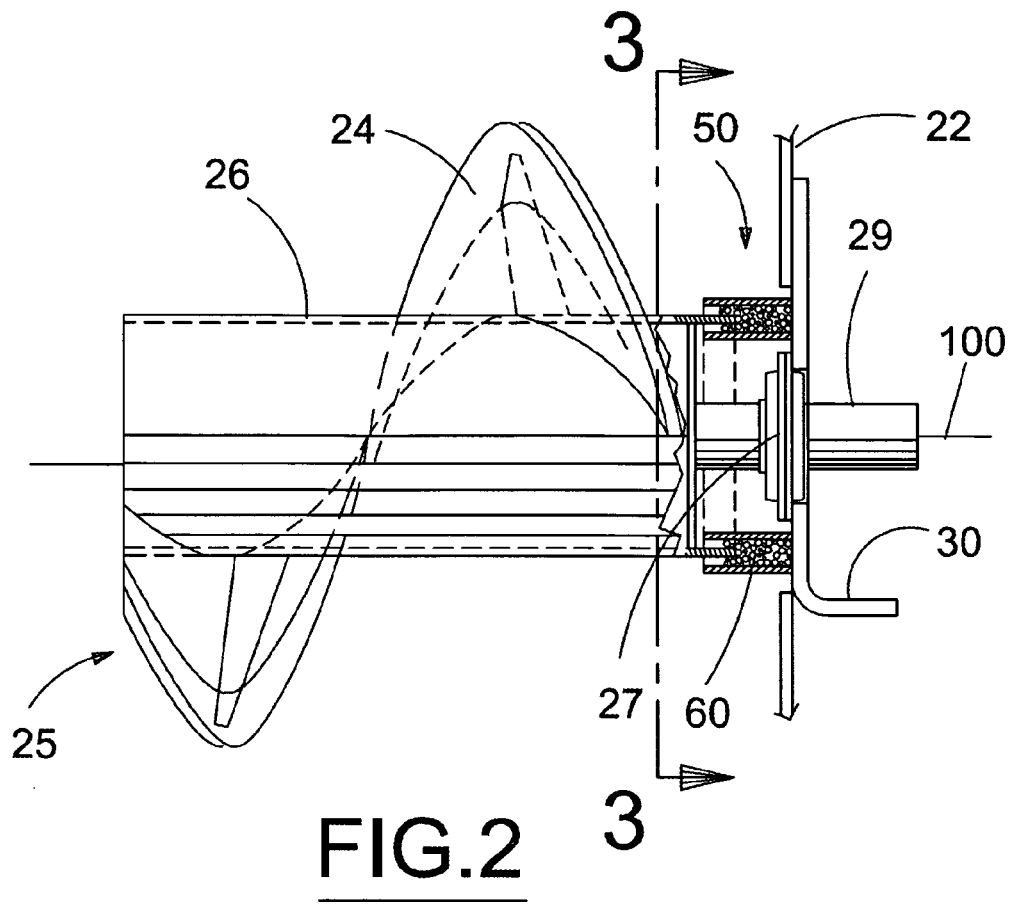
FIG. 2 is a partial elevation view of the end of an auger mechanism showing the arrangement of the seal mechanism of the present invention.
Figure 3:
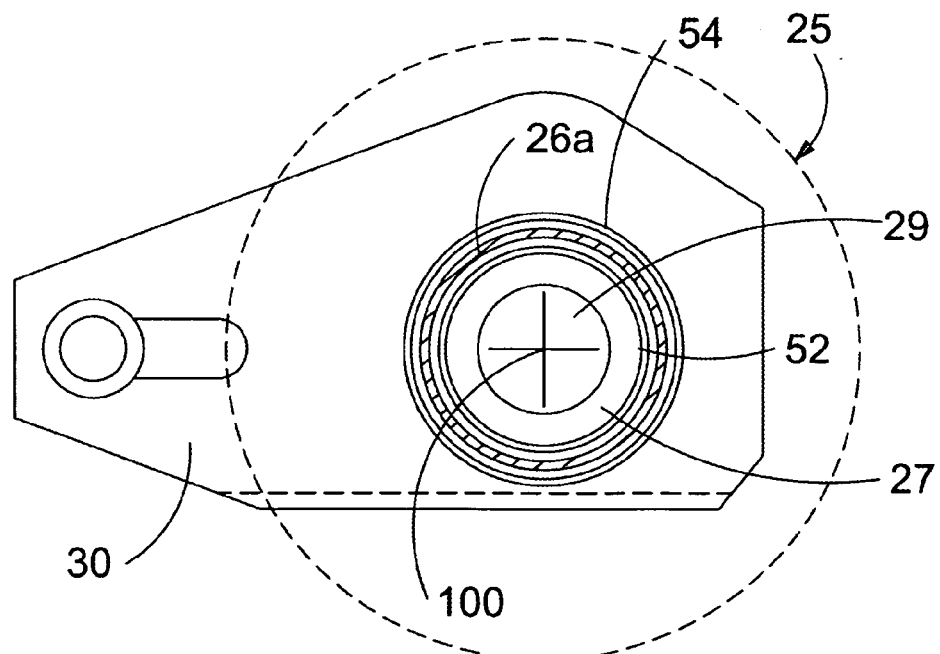
FIG. 3 is a section view of the of the end of the seal mechanism shown in FIG. 2 taken along view 3-3.
Figure 4:
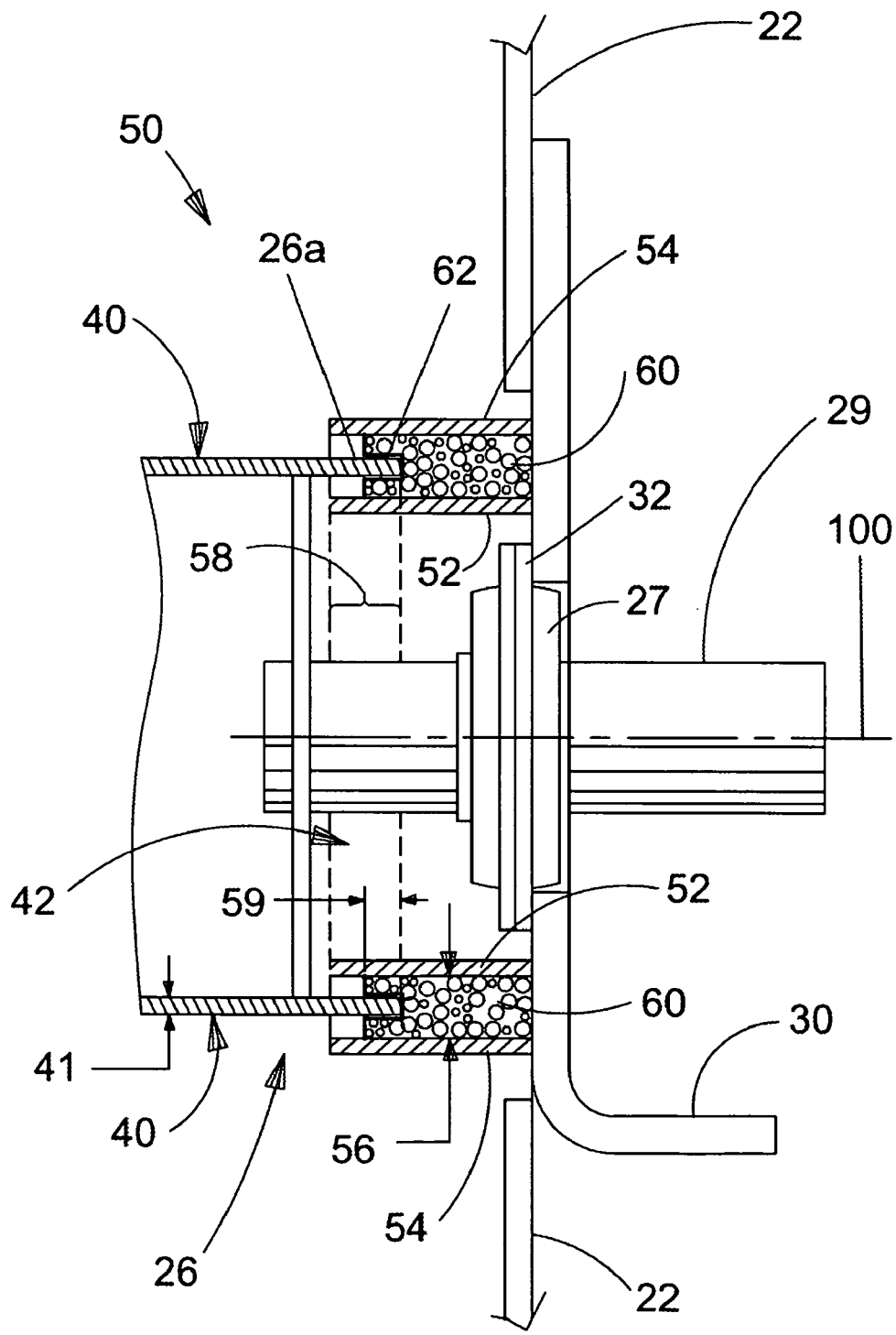
FIG. 4 is an expanded partial elevation view of the seal mechanism showing the relationship of the seal labyrinth and the flexible sealing material.

Referring now to FIGS. 2-4, wherein a one end of auger 25 is shown detailing the interface between the auger 25 and the side wall 22 support structure. A similar auger support arrangement (mirror image) is provided at the opposite end of auger 25. The description describes one end support only, but is applicable to both ends of the auger. Auger 25 comprises a cylindrically-shaped, elongate central core 26 having an exterior surface 40 around which flighting 24 is arranged to urge crop axially along the auger as it is rotated. The central core 26 is a generally hollow tube having a wall thickness 41. Central core 26 surrounds an interior cavity 42 that provides a protected location for housing an axle 29 and one or more bearings 27 to rotatably support the axle 29 for rotation about axis 100. Bearings 27 may be connected directly to the header side wall or preferably using an intermediately connected bracket arm 30 to enable easier assembly and disassembly of the header. Additional connection features such as a flangette 32 may be provided to further enhance assembly/disassembly ease.

In order to reduce the intrusion of contaminants, such as dirt, water, or other debris present in the header, from entering the interior cavity 42 where the axle 29 and bearings 27 are housed, a seal mechanism 50 is provided at each end of auger 25 adjacent to the connection with the end support structure bracket 30. Seal mechanism 50 is a labyrinth-type seal featuring an inner stationary barrier 52 and an outer stationary barrier 54 that are each cylindrically shaped and aligned on the rotational axis 100 of auger 25. Inner and outer stationary barriers 52, 54 extend inwardly along axis 100 for a short distance from the inward facing surface of support bracket 30 toward the auger 25. In the one embodiment, stationary barriers 52, 54 extend from the surface of bracket arm 30 for approximately two inches.

The inner and outer stationary barriers 52, 54 are concentrically arranged thereby forming a small annular space 56 therebetween. In one embodiment, the annular space 56 is on the order of one-half inch wide measured radially. The ends 26a of central core 26 are tube-like in configuration such that they may extend into the annular space 56. The diameters of inner and outer stationary barriers 52, 54 are close to the diameter of the central core 26 to maintain gaps between the labyrinth surfaces generally small (on the order of one-eight inch). The outer diameter of the inner barrier 52 is slightly smaller in diameter than the inner diameter of core 26. The outer diameter of core 26 is slightly smaller than the inner diameter of outer barrier 54. The arrangement allows the end 26a of the central core 26, itself a thin-walled cylindrical structure at the ends, to be inserted into the annular space 56 between the inner and outer stationary barriers 52, 54 until an overlap, shown as dimension 58 in FIG. 4, ranging between approximately three-quarters inch to one-inch exists. Annular space 56 has a width that is preferably approximately three times the wall thickness 41 of the central core 26. Variations in the width of the annular space 56 can accommodate larger tolerances in the auger assembly, but must be balanced with the additional sealant material required to fill a larger volume.

In order to provide a more effective seal between the tube end 26a of the auger core and the seal mechanism 50, the annular space 56 is filled with a sealant material 60 prior to assembly. The sealant material is preferably formed from a flexible polymeric material, initially in a liquid form to enable easy insertion into the annular space, and air curable to a flexible solid state to provide the desired properties. Additionally, many such sealants will adhesively bond to surface in the liquid state and retain these bonds as they cure. Once cured, the sealant loses much of the adhesive characteristic so that subsequent contact with other objects does not result in adhesion with the sealant. Thus, the liquid sealant will tend to adhere to the surfaces of the inner and outer barriers to secure the sealant in the annular space. Once the sealant has cured, it will not adhere to the end 26a of the central core.

When the end 26a of core 26 is inserted into the annular space 56, it compresses the sealant material 60 slightly, preferably approximately one-quarter of an inch. After a period of operation, tube end 26a will erode a channel 62 in the sealant material 60 that conforms to the tube end and thus provide a tight seal interface between the tube end 26a and the sealant material 60. The depth 59 of the eroded channel 62, approximately one-quarter inch, is sufficient to provide the tight seal interface between the tube end 26a and the sealant material 60 and prevent the entry of contaminants from outside of the auger central core 26. The sealant material 60, when cured, must be sufficiently flexible to withstand surface compression occurring during the auger assembly phase on the order of one-quarter to three-eighths of an inch. Additionally, the sealant material should be sufficiently soft as to enable formation of the channel 62 once the auger begins its rotation. In the preferred embodiment, sealant material 60 is a silicone-type rubber material, though other sealants which retain a degree of flexibility when cured are similarly suitable for use.

Installation of the seal mechanism 50 requires that sealant material 60 be placed in the annular space 56 to a pre-determined fill depth as measured from the base at bracket 30 and allowed to cure. The sealant fill depth must be sufficient so that when the end 26a of the core 26 is inserted into the annular space 56 to a desired overlap dimension 58, the desired degree of compression of the flexible sealant 60 will be achieved. When the auger 25 is installed into the header 20, an interference exists which causes the end 26a of the core 26 to compress the sealant 60 slightly. As the auger 25 is rotated, the end 26a will erode a circular channel 62 in the sealant as the sealant returns to its decompressed state. The channel will generally conform to the end 26a of the core 26. Minor variations in roundness of the end will cause the channel to be slightly wider than the wall thickness of the end. In this manner, each seal is unique to the central core end and easily accommodates production tolerance variations. One skilled in the art will recognize that variations in most of the relative dimensions are permissible provided sufficient compression of the sealant occurs as the core end 26a is inserted and the resultant channel depth 59 provides the necessary sealing capability.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A seal for a rotating crop conveying auger in a header on an agricultural crop harvester, the auger having a cylindrical core supporting helical flighting, generally opposing first and second ends, and an elongate axle extending from the first and second ends, respectively, a bearing on each end's respective axle for rotatably connecting the axle to the header along an axis of rotation, each end having a seal mechanism comprising:
    an inner barrier connected at one end to the header side wall, said inner barrier being cylindrically shaped, aligned on the axis of rotation, and extending along the axis of rotation toward the opposing end for a first length, and further having a first diameter;
    an outer barrier connected at one end to the header side wall, said outer barrier being cylindrically shaped and having a second diameter greater than said first diameter and being concentrically aligned relative to said inner barrier;
    an annular space between said inner and said outer barriers, said annular space having an annular opening distally opposed from the header side wall, said opening having a radial width;
    a hollow cylindrical end extending from the cylindrical core and having a wall thickness, said end projecting through said annular opening into said annular space, said radial width being greater than said wall thickness;
    a flexible sealant material disposed in said annular space; and
    a channel in said sealant material that receives a portion of said hollow cylindrical end and uniquely interacts therewith to form a barrier for preventing contaminants from reaching the bearing.

2. The seal of claim 1, further comprising a mounting bracket for connecting said inner barrier and said outer barrier to the side wall, said mounting bracket further having a bearing for rotatably supporting the auger, said bearing being disposed in said interior space when the auger is assembled into the header.

3. The seal of claim 2, wherein said cylindrical end is generally radially symmetrically positioned in said annular space.

4. The seal of claim 1, wherein said annular space width is approximately three times said wall thickness.

5. The seal of claim 1, wherein said sealant material is a polymeric material.

6. The seal of claim 5, wherein said sealant material is an air cured flexible polymeric material.

7. The seal of claim 6, wherein said sealant material is a silicon rubber material.

8. The seal of claim 1, wherein said channel has a depth into which said cylindrical first end extends and a width that is slightly greater than said wall thickness.

9. The seal mechanism of claim 8, wherein said depth is at least approximately one-quarter of an inch.

10. A seal for a rotating auger assembly in an agricultural harvester cutting header, the assembly having an axle supported by bearings connected to generally opposing side walls of the header so that the auger may rotate about a rotational axis transversely aligned with respect to the header, the seal comprising:
    a bracket arm for connecting to one of the bearings for supporting one end of the auger assembly and connecting the assembly to the header, the bracket arm having an inward facing surface oriented generally perpendicularly to the rotational axis;
    an inner barrier connected to said inward facing surface and extending distally away from said surface for a first length, said inner barrier having a cylindrical cross section aligned on said rotational axis and a first diameter;
    an outer barrier connected to said inward facing surface and extending distally away from said surface for generally said first length, said outer barrier having a cylindrical cross section aligned on said rotational axis and a second diameter, said second diameter being greater than said first diameter thereby allowing said outer barrier to be concentrically positioned with respect to said inner barrier;
    an annular space between said inner barrier and said outer barrier having an opening opposite to said bracket arm surface and a radial width;
    a flexible sealant material disposed in said annular space filling said annular space from said surface to a first depth that is less than said first length;
    a channel in said sealant material, said channel being cylindrically shaped and concentrically positioned between said inner and outer barriers and aligned on said rotational axis, said channel further having a channel width and a seal depth; and
    a tube end connected to the auger assembly for rotation therewith about the axis of rotation, said tube end having a wall thickness approximately equal to said channel width and being disposed in said annular space, entering said opening and extending toward said surface so that said tube end engages said channel thereby limiting the passage of contaminants through the seal.

11. The seal of claim 10, wherein said annular space width is approximately three times said wall thickness.

12. The seal of claim 10, wherein said sealant material is a polymeric material.

13. The seal of claim 12, wherein said polymeric material is an air-cured material.

14. The seal of claim 13, wherein said polymeric material is a silicon rubber material.

15. The seal of claim 10, wherein said channel width is equal to or greater than said wall thickness.

16. The seal of claim 10, wherein said seal depth is at least approximately one-quarter of an inch.

17. A method for sealing the interface between a rotating auger and an auger support on a header side wall for use in an agricultural harvester, the auger having a generally cylindrical core transversely disposed in the header for rotation about an axis, the method comprising the steps:
    providing an inward facing surface connected to the header and oriented generally perpendicularly to the rotational axis;
    providing a first short cylindrical barrier having first and second ends, the first end connected to the inward facing surface, the second end being positioned distally away from the surface to define a barrier length, the first barrier having a first diameter and being aligned on the rotational axis;
    providing a second short cylindrical barrier having third and fourth ends, the third end connected to the inward facing surface, the fourth end being positioned adjacent to the second end so that the second barrier length is generally equal to the length of the first barrier, the second barrier having a second diameter that is greater than the first diameter and being concentrically positioned with respect to the first barrier thereby creating an annular space therebetween, the annular space having an opening opposite to the inward facing surface;

providing a tube end on an end of the auger assembly for rotation therewith, the tube end being hollow, with walls having wall thickness, and having a diameter greater than the first barrier and less than the second barrier;

providing a flexible sealant material in flowable form that solidifies in a predetermined finite period of time;

injecting the flexible sealant material into the annular space to a depth that is less than the barrier length;

waiting for a period of time sufficient for the flexible sealant to solidify to a point at which it will not adhere to the tube end;

inserting the tube end into the annular space along the rotational axis to a relatively fixed position at which the tube end compresses the flexible sealant material; and rotating the tube end so that the tube end cuts a channel into the sealant material thereby creating a close seal interface between the sealant material and the tube end that is unique to the specific tube end and limits the passage of contaminants through the seal mechanism.

18. The method of claim 17, wherein the annular space width is approximately three times the tube end wall thickness.

19. The method of claim 18, wherein the sealant material is an air-cured polymeric material.

20. The method of claim 19, wherein the polymeric material is silicone rubber.

* * * * *